United States Patent
Zhamu et al.

(10) Patent No.: US 12,476,244 B2
(45) Date of Patent: Nov. 18, 2025

(54) SURFACE-STABILIZED CATHODE ACTIVE MATERIAL PARTICLES, LITHIUM SECONDARY BATTERIES CONTAINING SAME, AND METHOD OF MANUFACTURING

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

(21) Appl. No.: 15/785,351

(22) Filed: Oct. 16, 2017

(65) Prior Publication Data
US 2019/0115591 A1    Apr. 18, 2019

(51) Int. Cl.
*H01M 4/36* (2006.01)
*H01M 4/48* (2010.01)
*H01M 4/485* (2010.01)
*H01M 4/505* (2010.01)
*H01M 4/525* (2010.01)
(Continued)

(52) U.S. Cl.
CPC ........... *H01M 4/366* (2013.01); *H01M 4/483* (2013.01); *H01M 4/485* (2013.01); *H01M 4/505* (2013.01); *H01M 4/525* (2013.01); *H01M 4/5815* (2013.01); *H01M 4/582* (2013.01); *H01M 4/5825* (2013.01); *H01M 4/60* (2013.01); *H01M 4/602* (2013.01); *H01M 4/622* (2013.01); *H01M 4/624* (2013.01); *H01M 4/628* (2013.01); *H01M 10/052* (2013.01); *H01M 10/0525* (2013.01); *H01M 10/058* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2004/0018430 A1 * 1/2004 Holman .............. H01M 10/052
                                                        429/233
2005/0008938 A1 * 1/2005 Cho ...................... H01M 4/134
                                                        429/246
(Continued)

OTHER PUBLICATIONS

1 PCT/US18/54334 International Search Report and Written Opinion dated Dec. 26, 2018, 7 pages.

*Primary Examiner* — Christopher P Domone

(57) ABSTRACT

Provided is particulate of a cathode active material for a lithium battery, comprising one or a plurality of cathode active material particles being embraced or encapsulated by a thin layer of a high-elasticity polymer having a recoverable tensile strain no less than 5%, a lithium ion conductivity no less than $10^{-6}$ S/cm at room temperature, and a thickness from 0.5 nm to 10 μm, wherein the polymer contains an ultrahigh molecular weight (UHMW) polymer having a molecular weight from $0.5 \times 10^6$ to $9 \times 10^6$ grams/mole. The UHMW polymer is preferably selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof.

39 Claims, 6 Drawing Sheets

(51) Int. Cl.
*H01M 4/58* (2010.01)
*H01M 4/60* (2006.01)
*H01M 4/62* (2006.01)
*H01M 10/052* (2010.01)
*H01M 10/0525* (2010.01)
*H01M 10/058* (2010.01)
*H01M 4/02* (2006.01)

(56) References Cited

U.S. PATENT DOCUMENTS

| | | | |
|---|---|---|---|
| 2010/0247986 A1* | 9/2010 | Toyama | H01M 4/366 |
| | | | 429/61 |
| 2013/0236784 A1* | 9/2013 | Lin | H01M 4/62 |
| | | | 429/212 |
| 2014/0072879 A1* | 3/2014 | Chen | H01M 4/366 |
| | | | 429/188 |
| 2014/0154572 A1* | 6/2014 | Singh | H01M 4/622 |
| | | | 429/215 |
| 2014/0178747 A1* | 6/2014 | Tsai | H01M 4/5825 |
| | | | 429/188 |
| 2015/0044556 A1* | 2/2015 | Wang | H01M 4/366 |
| | | | 429/213 |
| 2016/0072132 A1* | 3/2016 | Liao | H01M 4/525 |
| | | | 429/231.95 |
| 2016/0164078 A1* | 6/2016 | Hong | H01M 4/366 |
| | | | 429/217 |
| 2016/0351877 A1* | 12/2016 | Kusachi | H01M 4/366 |
| 2017/0309917 A1* | 10/2017 | Lee | H01M 4/13 |
| 2018/0294474 A1 | 10/2018 | Zhamu et al. | |
| 2019/0115591 A1* | 4/2019 | Zhamu | H01M 4/60 |
| 2019/0252668 A1* | 8/2019 | Phares | H01M 4/525 |

* cited by examiner

SURFACE-STABILIZED CATHODE ACTIVE MATERIAL PARTICLES, LITHIUM SECONDARY BATTERIES CONTAINING SAME, AND METHOD OF MANUFACTURING

FIELD OF THE INVENTION

The present invention relates generally to the field of rechargeable lithium battery and, more particularly, to the lithium battery cathode active material, cathode layer, and battery cell, and a method of manufacturing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the anode layer is used to bond the anode active material (e.g. graphite or Si particles) and a conductive filler (e.g. carbon black particles or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode active material layer (or, simply, anode layer) and the latter one forms another discrete layer (current collector layer). A binder resin (e.g. PVDF or PTFE) is also used in the cathode to bond cathode active materials and conductive additive particles together to form a cathode active layer of structural integrity. The same resin binder also acts to bond this cathode active layer to a cathode current collector (e.g. Al foil).

Historically, lithium-ion batteries actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns (e.g. lithium dendrite formation and internal shorting) of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density<0.5 kW/kg), and necessity to use pre-lithiated cathodes (e.g. lithium cobalt oxide, as opposed to cobalt oxide), thereby limiting the choice of available cathode materials.

Further, these commonly used cathode active materials have a relatively low specific capacity (typically <220 mAh/g). These factors have contributed to the two major shortcomings of today's Li-ion batteries—a low energy density (typically 150-220 $Wh/kg_{cell}$) and low power density (typically <0.5 kW/kg). In addition, even though the lithium metal anode has been replaced by an intercalation compound (e.g. graphite) and, hence, there is little or no lithium dendrite issue in the lithium-ion battery, the battery safety issue has not gone away. There have been no short of incidents involving lithium-ion batteries catching fire or exploding. To sum it up, battery scientists have been frustrated with the low energy density, inadequate cycle life, and flammability of lithium-ion cells for over three decades!

There have been tremendous efforts made in battery industry and research community to improve existing cathode materials and develop new cathode compositions. However, current and emerging cathode active materials for lithium secondary batteries still suffer from the following serious drawbacks:

(1) The most commonly used cathode active materials (e.g. lithium transition metal oxides) contain a transition metal (e.g. Fe, Mn, Co, Ni, etc.) that is a powerful catalyst that can promote undesirable chemical reactions inside a battery (e.g. decomposition of electrolyte). These cathode active materials also contain a high oxygen content that could assist in the progression of thermal runaway and provide oxygen for electrolyte oxidation, increasing the danger of explosion or fire hazard. This is a serious problem that has hampered the widespread implementation of electric vehicles.

(2) Most of promising organic or polymeric cathode active materials are either soluble in the commonly used electrolytes or are reactive with these electrolytes. Dissolution of active material in the electrolyte results in a continuing loss of the active material. Undesirable reactions between the active material and the electrolyte lead to graduate depletion of the electrolyte and the active material in the battery cell. All these phenomena lead to capacity loss of the battery and shortened cycle life.

(3) The practical capacity achievable with current cathode materials (e.g. lithium iron phosphate and lithium transition metal oxides) has been limited to the range of 150-250 mAh/g and, in most cases, less than 200 mAh/g. Additionally, emerging high-capacity cathode active materials (e.g. $FeF_3$) still cannot deliver a long battery cycle life.

High-capacity cathode active materials, such as metal fluoride, metal chloride, and lithium transition metal silicide, can undergo large volume expansion and shrinkage during the discharge and charge of a lithium battery. These repeated volume changes lead to structural instability of the cathode, breakage of the normally weak bond between the binder resin and the active material, fragmentation of active material particles, delamination between the cathode active material layer and the current collector, and interruption of electron-conducting pathways. These high-capacity cathodes include $CoF_3$, $MnF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, etc. High-capacity cathode active materials also include a lithium transition metal silicate, $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

Hence, there is an urgent and continuing need for a new cathode active material and a cathode electrode (e.g. a cathode active material layer) that enable a lithium secondary battery to deliver a long cycle life and higher energy density. There is also a need for a method of readily and easily producing such a material in large quantities. Thus, it is a primary object of the present invention to meet these needs and address the issues associated the rapid capacity decay of a lithium battery.

SUMMARY OF THE INVENTION

Herein reported is a cathode active material layer for a lithium battery that contains a very unique class of cathode active material. Specifically, the cathode active material particles are fully embraced or encapsulated by a protecting polymer that is capable of overcoming the cathode-induced rapid capacity decay problem commonly associated with a rechargeable lithium battery.

The instant invention is directed at a lithium-ion battery (using a lithium intercalation compound or conversion-type compound, not lithium metal, as the anode active material) or a lithium metal battery (using lithium metal as the anode active material and a lithium intercalation or conversion compound as the cathode active material, but not including sulfur or alkali metal polysulfide). Both alkali metal-sulfur cells (Li—S, Na—S, and K—S) and the lithium-air cell are excluded from the claims of instant application.

In a preferred embodiment, the invention provides a cathode active material particulate for a lithium battery, preferably a rechargeable battery. The cathode active material particulate is composed of one or a plurality of cathode active material particles being fully embraced or encapsulated by a thin layer of a protecting polymer. The protecting polymer layer preferably has a molecular weight less than $0.5 \times 10^6$ g/mole (i.e. not a so-called ultra-high molecular weight polymer), a thickness from 0.5 nm to 5 μm (preferably from 1 nm to 2 μm and more preferably <1 μm), and a lithium ion conductivity from $10^{-8}$ S/cm to $5 \times 10^{-2}$ S/cm at room temperature and the protecting polymer layer contains a polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol (PEG), a chemical derivative of PEG, poly(ethylene glycol diacrylate) (PEGDA), polyethylene glycol methyl ether, polyethylene glycol dimethyl ether, a sulfonated polymer, an interpenetrating polymer network thereof, or a combination thereof. The protecting polymer preferably has a lithium ion conductivity no less than $10^{-6}$ S/cm at room temperature (preferably and more typically no less than $10^{-4}$ S/cm and more preferably and typically no less than $10^{-3}$ S/cm).

It may be noted that the protecting polymer, when not part of a cross-linked network of chains, has a molecular weight less than $0.5 \times 10^6$ g/mole (i.e. not a so-called ultra-high molecular weight polymer). It is well-known in the field of polymer science that a polymer normally has a molecular weight less than $0.5 \times 10^6$ g/mole, unless otherwise specified in a report. When the term "ultra-high molecular weight polymer" is not used, the polymer normally refers to a chain having a molecular weight less than $0.5 \times 10^6$ g/mole.

The particulate (secondary particle) preferably has a diameter from 1 μm to 50 μm (more preferably from 5 μm to 20 μm) even though the primary particles (the constituent cathode active material particles) have a diameter or thickness from 1 nm to 5 μm (preferably less than 1 μm and further preferably less than 100 nm).

In certain other preferred embodiments, the cathode active material particles are coated with a layer of carbon, graphene, electron-conducting polymer, or a combination thereof to form conductive material-coated particles prior to being embraced by the protecting polymer layer.

Preferably, the particulates are substantially or essentially spherical or ellipsoidal in shape. Also preferably, the particulate have a diameter or thickness smaller than 30 μm, more preferably smaller than 20 μm, and most preferably smaller than 10 μm.

The interpenetrating polymer network (IPN) can include a simultaneous polymer interpenetrating network (S-IPN), a sequential IPN or semi-interpenetrating network (semi-IPN).

The sulfonated polymer is preferably selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylene-propylene copolymer (FEP), sulfonated ethylene-chlorotrifluoroethylene copolymer (ECTFE), sulfonated poly vinylidene fluoride (PVDF), sulfonated copolymers of polyvinylidene fluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

In certain embodiments, the protecting polymer contains an electrically conductive material dispersed therein. The electrically conducting material may be selected from an electron-conducting polymer, a metal particle or wire, a graphene sheet, a carbon fiber, a graphite fiber, a carbon nanofiber, a graphite nanofiber, a carbon nanotube, a graphite particle, an expanded graphite flake, an acetylene black particle, or a combination thereof. The electrically conducting material (e.g. metal nanowire, nanofiber, etc.) preferably has a thickness or diameter less than 100 nm and more preferably <10 nm.

In certain embodiments, the protecting polymer contains a lithium salt dispersed between chains of the protecting polymer. The lithium salt dispersed in the protecting polymer may be preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate(LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (Li-BETI), lithium bis(trifluoromethanesulphonyl)imide, lithium bis(fluorosulphonyl)imide, lithium trifluoromethanesulfonimide (LiTFSI), an ionic liquid-based lithium salt, or a combination thereof.

The cathode active material particulate may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof. The inorganic material does not include sulfur or alkali metal polysulfide.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)](PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene](PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

In some embodiments, one particle or a cluster of particles may be coated with or embraced by a layer of carbon disposed between the particle(s) and the protecting polymer layer (the encapsulating shell). Alternatively or additionally, a carbon layer may be deposited to embrace the encapsulated particle or the encapsulated cluster of multiple cathode active material particles.

The particulate may further contain a graphite, graphene, or carbon material mixed with the cathode active material particles and disposed inside the encapsulating or embracing polymer shell. The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

Preferably and typically, the protecting polymer layer has a lithium ion conductivity no less than $10^{-5}$ S/cm, more preferably no less than $10^{-3}$ S/cm, and most preferably no less than $10^{-2}$ S/cm. Some of the selected polymers exhibit a lithium-ion conductivity greater than $10^{-2}$ S/cm. In some embodiments, the protecting polymer is a neat polymer containing no additive or filler dispersed therein. In others, the protecting polymer is polymer matrix composite containing from 0.1% to 50% by weight (preferably from 1% to 35% by weight) of a lithium ion-conducting additive dispersed in a protecting polymer matrix material. In some embodiments, the protecting polymer contains from 0.1% by weight to 10% by weight of a reinforcement nanofilament selected from carbon nanotube, carbon nanofiber, graphene, or a combination thereof.

In some embodiments, the protecting polymer is mixed with an elastomer (to form a blend, co-polymer, or interpenetrating network) selected from natural polyisoprene (e.g. cis-1,4-polyisoprene natural rubber (NR) and trans-1, 4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-E1), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the protecting polymer layer is a composite containing a lithium ion-conducting additive dispersed in a protecting polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

The protecting polymer may form a mixture, blend, co-polymer, or semi-interpenetrating network (semi-IPN) with an electron-conducting polymer selected from polyaniline, polypyrrole, polythiophene, polyfuran, a bi-cyclic polymer, derivatives thereof (e.g. sulfonated versions), or a combination thereof.

The present invention also provides a cathode electrode that contains the presently invented particulates of protecting polymer-encapsulated cathode active material particles, and an optional conductive additive (e.g. expanded graphite flakes, carbon black, acetylene black, or carbon nanotube), an optional (typically required) resin binder that bonds the particulates and the conductive additive together.

The present invention also provides a lithium battery containing an optional anode current collector, an anode active material layer, an invented cathode active material layer as described above, an optional cathode current collector, an electrolyte in ionic contact with the anode active material layer and the cathode active material layer and an optional porous separator. The lithium battery may be a lithium-ion battery or lithium metal battery (containing lithium metal or lithium alloy as the main anode active material and containing no intercalation-based anode active material), including lithium-selenium battery, but excluding the alkali metal-sulfur battery and lithium-air battery for the purpose of defining the claims.

The present invention also provides a method of manufacturing a lithium battery. The method includes (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically isolating (separating) the anode and the cathode. The operation of providing the cathode active material layer includes fully embracing or encapsulating particles of a cathode active material by a protecting polymer layer to form protected particulates. The protecting polymer layer preferably has a thickness from 0.5 nm to 5 µm (preferably from 1 nm to 2 µm and more preferably <1 µm), and a lithium ion conductivity from $10^{-8}$ S/cm to $5 \times 10^{-2}$ S/cm at room temperature and the protecting polymer layer contains a polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol (PEG), a chemical derivative of PEG, poly (ethylene glycol diacrylate) (PEGDA), polyethylene glycol methyl ether, polyethylene glycol dimethyl ether, a sulfonated polymer, an interpenetrating polymer network thereof, or a combination thereof. The protecting polymer preferably has a lithium ion conductivity no less than $10^{-6}$ S/cm at room temperature (preferably and more typically no less than $10^{-4}$ S/cm and more preferably and typically no less than $10^{-3}$ S/cm).

This presently invented protecting polymer layer appears to be capable of isolating (preventing) liquid electrolyte from being in direct physical contact with the cathode active material and, thus, preventing the catalytic elements (e.g. Fe, Mn, Ni, Co, etc.) in the cathode active material from catalyzing the decomposition of the electrolyte. This otherwise could cause fast capacity decay and fire and explosion hazard. This protecting polymer layer also prevents dissolution of an organic or polymeric active material in the liquid electrolyte, which otherwise would lead to continuing loss of the active material and, thus, continuing loss in capacity.

Preferably, the protecting polymer layer has a lithium ion conductivity from $1 \times 10^{-5}$ S/cm to $5 \times 10^{-2}$ S/cm. In some embodiments, the high-elasticity polymer has a recoverable tensile strain from 10% to 200% (more preferably >30%, and further more preferably >50%).

In certain embodiments, the operation of providing a protecting polymer layer contains providing a mixture/blend/composite of a protecting polymer with an elastomer, an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nanofiber, and/or graphene), or a combination thereof.

In this mixture/blend/composite, the lithium ion-conducting material is dispersed in the protecting polymer and is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the lithium ion-conducting material is dispersed in the protecting polymer and is selected from lithium perchlorate, $LiClO_4$, lithium hexafluoro-phosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

Preferably, the cathode active material particles are coated with a layer of carbon or graphene prior to being embraced by the protecting polymer layer. Preferably, cathode active material particles and particles of a carbon or graphite material are bonded together by the protecting polymer. Preferably, the cathode active material particles, possibly along with a carbon or graphite material and/or with some internal graphene sheets, are embraced by graphene sheets to form cathode active material particulates, which are then encapsulated by the presently invented protecting polymer layer. The graphene sheets may be selected from pristine graphene (e.g. that prepared by CVD or liquid phase exfoliation using direct ultrasonication), graphene oxide, reduced graphene oxide (RGO), graphene fluoride, doped graphene, functionalized graphene, etc.

DESCRIPTION OF THE PREFERRED EMBODIMENTS

This invention is directed at the cathode active material layer (positive electrode layer, not including the cathode current collector) containing a cathode active material in a protected particulate form for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration or any type of electrolyte. The invention also provides such a protected cathode particulate composed of cathode active material particles encapsulated or embraced by a thin layer of a protecting polymer.

In certain embodiments, the invention provides a particulate of a cathode active material for a lithium battery, preferably a rechargeable battery. The cathode active material particulate is composed of one or a plurality of cathode active material particles being fully embraced or encapsulated by a thin layer of a protecting polymer. The protecting polymer layer contains a member of a special class of protecting polymers. The protecting polymer member preferably has a molecular weight less than $0.5 \times 10^6$ g/mole (i.e. not a so-called ultra-high molecular weight polymer), a thickness from 0.5 nm to 5 μm (preferably from 1 nm to 2 μm and more preferably <1 μm), and a lithium ion conductivity from $10^{-8}$ S/cm to $5 \times 10^{-2}$ S/cm at room temperature. Specifically, the protecting polymer layer contains a polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol (PEG), a chemical derivative of PEG, poly(ethylene glycol diacrylate) (PEGDA), polyethylene glycol methyl ether, polyethylene glycol dimethyl ether, a sulfonated polymer, an interpenetrating polymer network thereof, or a combination thereof. The protecting polymer preferably has a lithium ion conductivity no less than $10^{-6}$ S/cm at room temperature (preferably and more typically no less than $10^{-4}$ S/cm and more preferably and typically no less than $10^{-3}$ S/cm). Such a particulate can be used as a cathode active material for a lithium-ion battery or lithium metal battery.

Figure 1A:
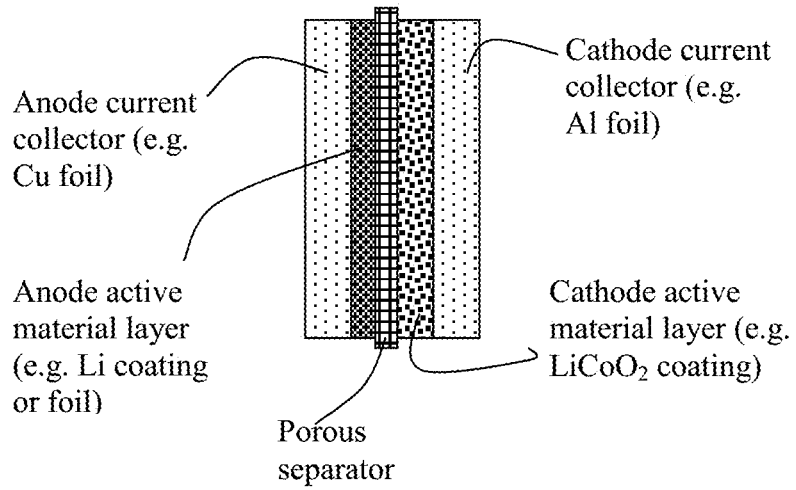
FIG. 1(A) Schematic of a prior art lithium-ion battery cell, wherein the anode layer is a thin coating of an anode active material (Li or lithiated Si) and the cathode is composed of particles of a cathode active material, a conductive additive (not shown) and a resin binder (not shown).
Figure 1B:
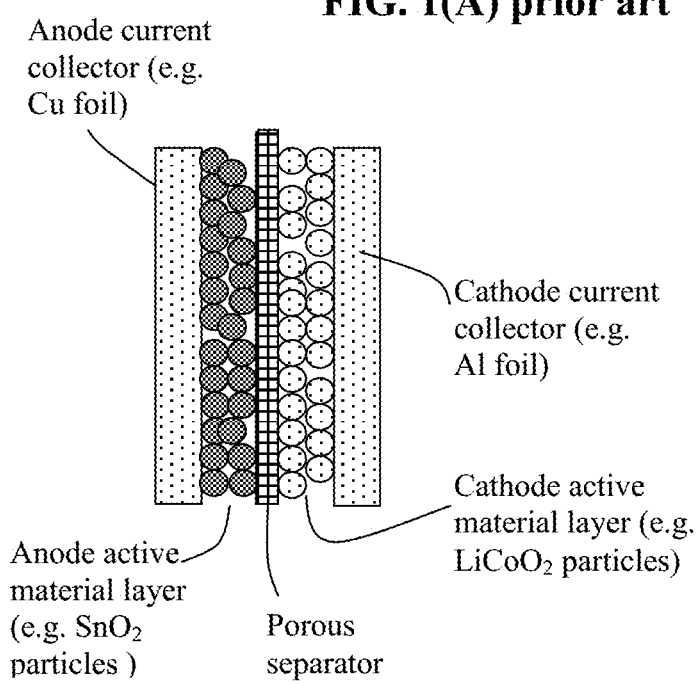
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area. Similarly, the cathode layer is composed of particles of a cathode active material (e.g. $LiCoO_2$, $LiMnO_4$, $LiFePO_4$, etc.), a conductive additive (e.g. carbon black particles), and a resin binder (e.g. PVDF or PTFE). This cathode layer is typically 100-300 μm thick.

In a lithium metal cell, as illustrated in FIG. 1(A), the anode active material is deposited in a thin film form or a thin foil form directly onto an anode current collector. If a layer of Li coating or Li foil is used as the anode active material, the battery is a lithium metal battery, lithium sulfur battery, lithium-air battery, lithium-selenium battery, etc.

In order to obtain a higher energy density lithium-ion cell, the anode in FIG. 1(B) can be designed to contain higher-capacity anode active materials having a composition formula of $Li_aA$ (A is a metal or semiconductor element, such as Al and Si, and "a" satisfies $0<a\leq 5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

One major problem in the current lithium battery is the notion that active material particles can get fragmented and the binder resin can detach from both the active material particles and conductive additive particles due to volume expansion/shrinkage of the active material particles during the charge and discharge cycles. These binder detachment and particle fragmentation phenomena lead to loss of contacts between active material particles and conductive additives and loss of contacts between the active material and its current collector. These adverse effects result in a significantly shortened charge-discharge cycle life. Another problem is the notion that certain cathode active materials (e.g. organic and polymeric active material) can be dissolved in the liquid electrolyte, leading to rapid capacity decay. A further problem, typically unrecognized in battery industry, is related to the notion that the cathode active material can contain some transition metal elements which can catalyze the decomposition of electrolyte, resulting in not only capacity decay but also the formation of volatile gases and fire hazard.

We have solved these challenging issues that have troubled battery designers and electrochemists alike for more than 30 years by developing a new class of cathode active materials. The cathode active material layer comprises multiple cathode active material particles that are fully embraced or encapsulated by a presently invented protecting polymer layer.

Figure 2:
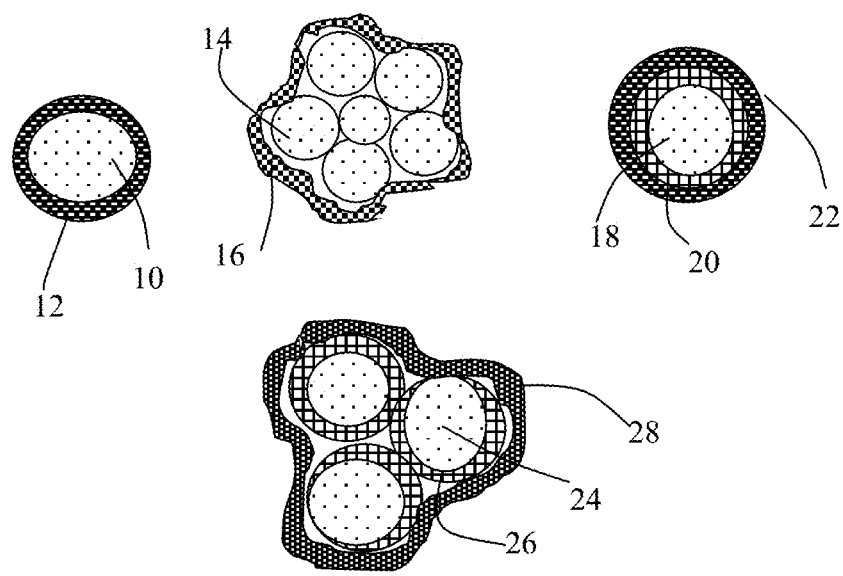
FIG. 2 Several different types of particulates containing protecting polymer encapsulated cathode active material particles.

As illustrated in FIG. 2, the present invention provides four major types of particulates of protecting polymer-encapsulated cathode active material particles. The first one is a single-particle particulate containing a cathode active material core 10 encapsulated by a protecting polymer shell 12. The second is a multiple-particle particulate containing multiple cathode active material particles 14 (e.g. $FeF_3$ particles), optionally along with other conductive materials (e.g. particles of graphite or hard carbon, not shown), which are encapsulated by a protecting polymer layer 16. The third is a single-particle particulate containing a cathode active material core 18 coated by a carbon or graphene layer 20 (or other conductive material) further encapsulated by a protecting polymer layer 22. The fourth is a multiple-particle particulate containing multiple cathode active material particles 24 (e.g. $FeF_3$ particles) coated with an electron-conducting material layer 26 (carbon, graphene, etc.), optionally along with other active materials or conductive additive, which are encapsulated by a protecting polymer shell 28.

The application of the presently invented protecting polymer encapsulation approach is not limited to any particular class of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, CuF, $SnF_2$, AgF, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq 1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The particles of the cathode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the cathode active material layer) or pre-lithiated to a desired extent (up to the maximum capacity as allowed for a specific element or compound).

The invention also provides a method of manufacturing a lithium battery, comprising: (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically separating the anode and the cathode; wherein the operation of providing the cathode active material layer includes providing multiple particulates of a cathode active material, wherein at least one of the particulates is composed of one or a plurality of cathode active material particles being fully embraced or encapsulated by a thin layer of a protecting polymer having a molecular weight less than $0.5 \times 10^6$ g/mole, a lithium ion conductivity from $10^{-8}$ S/cm to $5 \times 10^{-2}$ S/cm at room temperature, and a thickness from 0.5 nm to 10 μm. The protecting polymer layer contains a polymer selected from the group consisting of poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol (PEG), chemical derivatives of PEG, poly(ethylene glycol diacrylate) (PEGDA), polyethylene glycol methyl ether, polyethylene glycol dimethyl ether, sulfonated polymers, interpenetrating polymer networks thereof, and combinations thereof.

The operation of providing the cathode active material layer includes fully embracing or encapsulating particles of a cathode active material by a protecting polymer layer to form protected particulates. The first step for producing encapsulated active material particles is to dissolve a protecting polymer or its precursor in a solvent to form a solution. Subsequently, particles of a cathode active material (e.g. lithium metal oxide, lithium metal fluoride, etc.) are dispersed in a polymer-solvent solution to form a suspension (also referred to as dispersion or slurry) of an active material particle-polymer mixture. This suspension can then be subjected to a solvent removal treatment while individual particles remain substantially separated from one another. The polymer precipitates out to deposit on surfaces of these active material particles. This can be accomplished, for instance, via spray drying, ultrasonic spraying, air-assisted spraying, aerosolization, and other secondary particle formation procedures. These techniques will be further discussed later.

One may also choose to add some lithium salt into the slurry. For instance, the procedure may begin with dissolving polyethylene glycol dimethyl ether (PEG-me) in a liquid solvent (e.g. acetonitrile) to form a solution. A lithium salt, LiPF$_6$, can then be added into the solution at a desired weight percentage. Then, particles of a selected cathode active material are introduced into the mixture solution to form a slurry. The slurry may then be subjected to a micro-encapsulation procedure to produce cathode active material particles coated with an embracing layer of PEG-me containing LiPF$_6$ dispersed therein (in the amorphous zones of the polymer).

The aforementioned protecting polymers may be used alone to encapsulate the cathode active material particles. Alternatively, the protecting polymer can be mixed with a broad array of elastomers, electrically conducting polymers, lithium ion-conducting materials, and/or strengthening materials (e.g. carbon nanotube, carbon nano-fiber, or graphene sheets).

A broad array of elastomers can be mixed with a protecting polymer to form a blend, co-polymer, or interpenetrating network that encapsulates the cathode active material particles. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-E1), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, a protecting polymer can form a polymer matrix composite containing a lithium ion-conducting additive dispersed in the high-elasticity polymer matrix material, wherein the lithium ion-conducting additive is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, $Li_2S$, $Li_xSO_y$, or a combination thereof, wherein X=F, Cl, I, or Br, R=a hydrocarbon group, x=0-1, y=1-4.

In some embodiments, the protecting polymer can be mixed with a lithium ion-conducting additive, which contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato) borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The protecting polymer may form a mixture, blend, or semi-interpenetrating network with an electron-conducting polymer selected from polyaniline, polypyrrole, polythiophene, polyfuran, a bi-cyclic polymer, derivatives thereof (e.g. sulfonated versions), or a combination thereof. In some embodiments, the protecting polymer may form a mixture, co-polymer, or semi-interpenetrating network with a lithium ion-conducting polymer.

Unsaturated rubbers that can be mixed with the protecting polymer include natural polyisoprene (e.g. cis-1,4-polyisoprene natural rubber (NR) and trans-1,4-polyisoprene guttapercha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-E1), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating active material particles.

Several micro-encapsulation processes may be used to encapsulate particles of an active material. These processes typically require the high-elasticity polymer or its precursor (monomer or oligomer) to be dissolvable in a solvent. Fortunately, all the protecting polymers or their precursors used herein are soluble in some common solvents. The polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized.

There are three broad categories of micro-encapsulation methods that can be implemented to produce high-elasticity polymer-encapsulated particles of an active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Particles of an active material may be encapsulated using a rotating extrusion head containing concentric nozzles. In this process, a stream of core fluid (slurry containing particles of an active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

In the following examples, certain protecting polymers were used to illustrate the best mode of practice. Other protecting polymers in the list provided in previous sections can be similarly used. These should not be construed as limiting the scope of invention.

EXAMPLE 1

Cathode Active Material Layers Containing Polymer-Encapsulated $V_2O_5$ Particles Cathode active material layers were prepared from $V_2O_5$ particles and graphene-embraced $V_2O_5$ particles, respectively. $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced $V_2O_5$ composite particulates.

Selected amounts of $V_2O_5$ particles and graphene-embraced $V_2O_5$ particles, respectively, were then each made into PEG polymer-encapsulated particulates according to the following procedure:

PEG was dissolved in DI-water (1.6 wt. %) to form a homogenous and clear solution first. Then, two routes were followed to prepare polymer-encapsulated $V_2O_5$ particles and graphene-embraced $V_2O_5$ particles. In the first route, $V_2O_5$ particles and graphene-embraced $V_2O_5$ particles, respectively, were dispersed in the PEG-water solution to form a slurry. In some samples, 0.5%-5% of a conductive filler (e.g. graphene sheets) was added into the slurry. The slurries were separately spray-dried to form particulates of polymer-encapsulated $V_2O_5$ and graphene-embraced $V_2O_5$ particles.

In the second route, 1-45% of lithium salt ($LiClO_4$) was dissolved in the solution to form a series of lithium-salt containing solutions. Then, $V_2O_5$ particles or graphene-embraced $V_2O_5$ particles were dispersed in the lithium-containing PEG-water solution to form a series of slurries. In some samples, 0.5%-5% of a conductive filler (e.g. graphene sheets) was added into the slurry. Each slurry was spray-dried to form particulates of polymer- or polymer/lithium salt-encapsulated $V_2O_5$ or graphene-embraced $V_2O_5$ particles. The polymer or polymer/lithium salt shell can contain some conducting material (graphene sheets, in this case).

Some of the particulate samples were subsequently soaked in a solvent (preferably a desired lithium-ion battery electrolyte solvent such as ethylene carbonate, EC), allowing the solvent to permeate into the amorphous zones of the polymer phase embracing the anode particles. The polymer shell thickness was varied from 55 nm to 354 nm.

For electrochemical testing, a comparative electrode using a conventional cathode (no encapsulation) was also prepared. The working electrodes were prepared by mixing 85 wt. % $V_2O_5$ or 88% of graphene-embraced $V_2O_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\varphi$=12 mm) and dried at 100° C. for 24 h in vacuum.

Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cell featuring high-elasticity polymer binder and that containing PVDF binder were evaluated by galvanostatic charge/discharge cycling at a current density of 50 mA/g using an Arbin electrochemical workstation.

Figure 3:
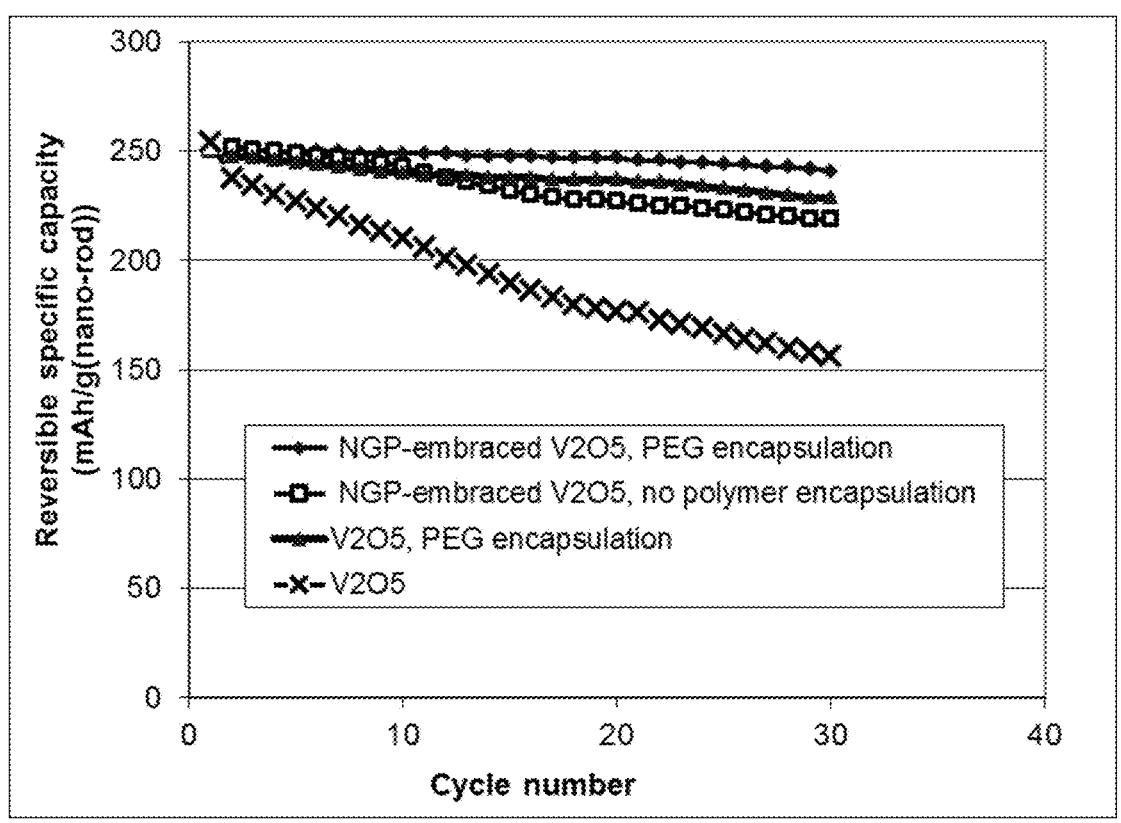
FIG. 3 The specific intercalation capacity curves of four lithium cells: cathode containing un-encapsulated $V_2O_5$ particles, cathode containing un-encapsulated but graphene-embraced $V_2O_5$ particles, cathode containing PEG-encapsulated $V_2O_5$ particles, and cathode containing PEG-encapsulated graphene-embraced $V_2O_5$ particles.

Summarized in FIG. 3 are the specific intercalation capacity curves of four lithium cells: cathode containing un-encapsulated $V_2O_5$ particles, cathode containing un-encapsulated but graphene-embraced $V_2O_5$ particles, cathode containing PEG polymer-encapsulated $V_2O_5$ particles, and cathode containing PEG polymer-encapsulated graphene-embraced $V_2O_5$ particles. As the number of cycles increases, the specific capacity of the un-encapsulated $V_2O_5$ electrode drops at the fastest rate. In contrast, the presently invented PEG polymer encapsulation provides the battery cell with a significantly more stable and high specific capacity for a large number of cycles. These data have clearly demonstrated the surprising and superior performance of the presently invented PEG polymer encapsulation approach.

The protecting polymer encapsulation shell appears to be capable of reversibly deforming to a great extent without breakage when the active material particles expand and shrink. The polymer also remains chemically bonded to the binder resin when the encapsulated particles expand or shrink. In contrast, the PVDF binder is broken or detached from some of the non-encapsulated active material particles. These were observed by using SEM to examine the surfaces of the electrodes recovered from the battery cells after some numbers of charge-discharge cycles.

EXAMPLE 2

Polyethylene Glycol Methyl Ether-Embraced Lithium Iron Phosphate (LFP) Particles The protecting polymer for encapsulation of LFP particles was based on medium molecular (220,000 g/mole) polyethylene glycol methyl ether (PEG-me). In a typical procedure, PEG-me (0.3 g) was dissolved in 5 ml of ethanol to form a solution. The LFP particles were then dispersed in the solution to form a slurry. The slurries were then subjected to a micro-encapsulation procedure (spray-drying) to produce anode active material particles having entire exterior surfaces being coated with an embracing layer of the polymers.

Figure 4:
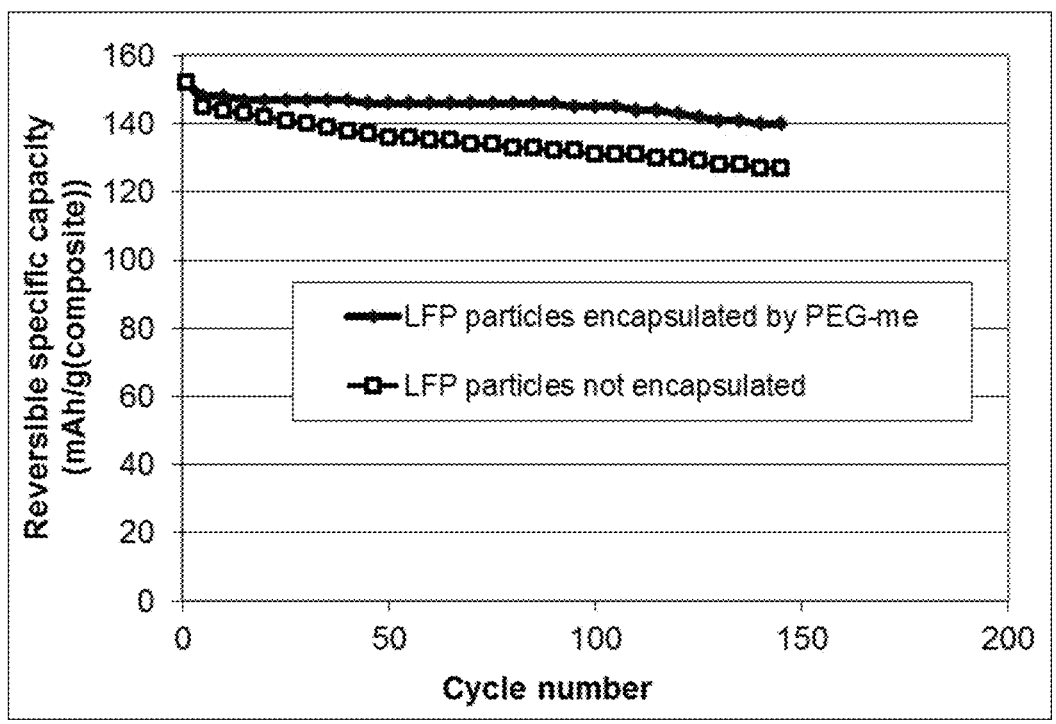
FIG. 4 The specific capacity values of two lithium battery cells having a cathode active material featuring (1) polyethylene glycol methyl ether (PEG-me)-encapsulated carbon-coated $LiFePO_4$ particles and (2) carbon-coated $LiFePO_4$ particles without polymer encapsulation, respectively.

The battery cells from the polymer-encapsulated carbon-coated LFP particles and non-encapsulated carbon-coated LFP particles were prepared using a procedure similar to that described in Example 1. FIG. 4 shows that the cathode prepared according to the presently invented protecting polymer encapsulation approach offers a significantly more stable cycling behavior and higher reversible capacity compared to the non-encapsulated LFP particle-based cathode. The protecting polymer is more capable of holding the active material particles and conductive additive together, significantly improving the structural integrity of the active material electrode. The protecting polymer also acts to isolate the electrolyte from the active material yet still allowing for easy diffusion of lithium ions.

EXAMPLE 3

Metal Fluoride Nanoparticles Encapsulated by a PPO

For encapsulation of $FeF_3$ nanoparticles, a PPO polymer was implemented as an embracing polymer shell by using a procedure similar to that described in Example 1. Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 µm. Each type of these metal fluoride particles, along with graphene sheets (as a conductive additive), was then added into a PPO-solvent liquid suspension to form a multiple-component slurry. The slurry was then spray-dried to form isolated polymer embraced particles.

Figure 5:
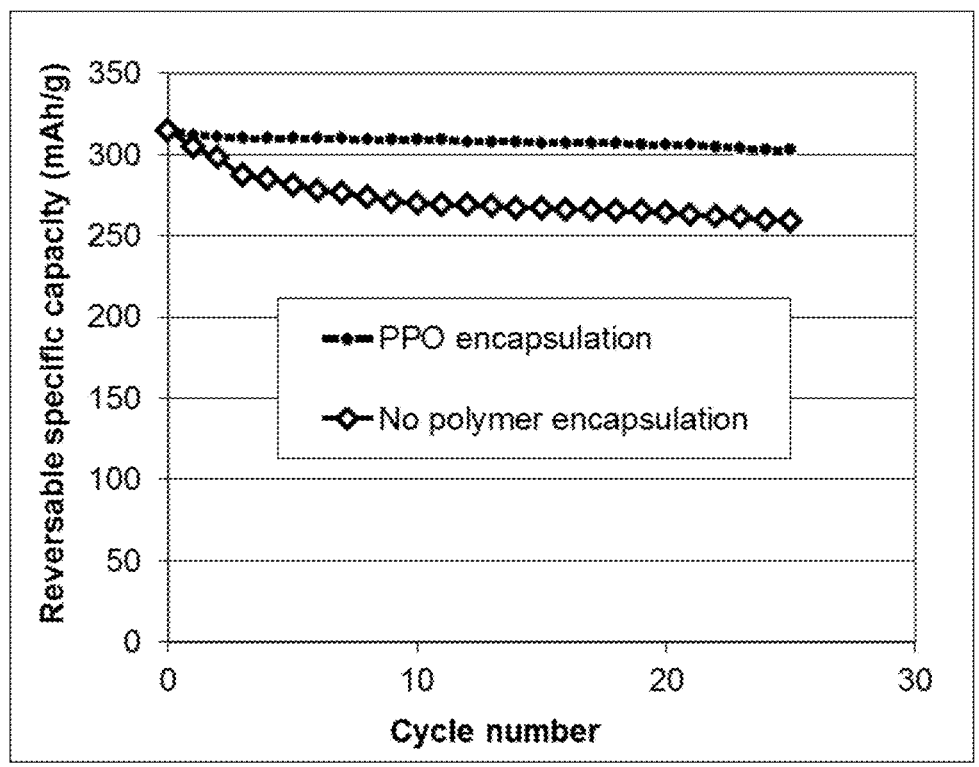
FIG. 5 The discharge capacity curves of two coin cells having two different types of cathode active materials: (1) high-elasticity UHMW PPO-encapsulated metal fluoride particles and (2) non-encapsulated metal fluorides.

Shown in FIG. 5 are the discharge capacity curves of two coin cells having two different types of cathode active materials: (1) PPO polymer-encapsulated metal fluoride particles and (2) non-encapsulated metal fluorides. These results have clearly demonstrated that the protecting polymer encapsulation strategy provides excellent protection against capacity decay of a lithium metal battery featuring a high-capacity cathode active material.

The protecting polymer appears to be capable of reversibly deforming without breakage when the cathode active material particles expand and shrink. The polymer also remains chemically bonded to the binder resin when the active particles expand or shrink. In contrast, both SBR and PVDF, the two conventional binder resins, are broken or detached from some of the non-encapsulated active material particles. The protecting polymer has contributed to the structural stability of the electrode layer. These were observed by using SEM to examine the surfaces of the electrodes recovered from the battery cells after some numbers of charge-discharge cycles.

EXAMPLE 4

Metal Naphthalocyanine/Reduced Graphene Oxide (FePc/RGO) Hybrid Particulates Encapsulated by a Protecting Polymer Particles of combined FePc/graphene sheets were obtained by ball-milling a mixture of FePc and RGO in a milling chamber for 30 minutes. The resulting FePc/RGO mixture particles were potato-like in shape. Some of these mixture particles were encapsulated by an UHMW PAN polymer and some by medium-molecular weight polymer using the pan-coating procedure. Three lithium cells were prepared, each containing a Li foil anode, a porous separator, and a cathode layer of FePc/RGO particles (encapsulated or un-encapsulated).

Figure 6:
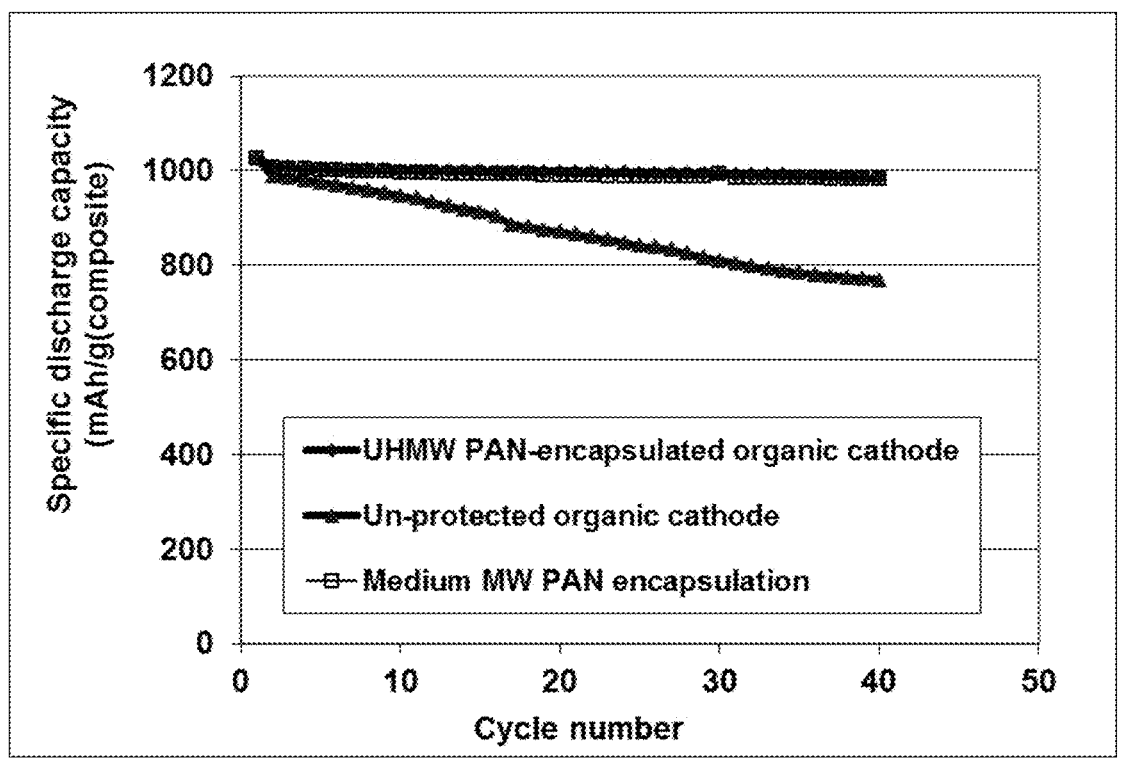
FIG. 6 Specific capacities of three lithium-FePc (organic) cells, each having Li as an anode active material and FePc/RGO mixture particles as the cathode active material (one cell containing un-encapsulated particles, a second cell containing particles encapsulated by UHMW PAN polymer, and third cell containing particles encapsulated by medium molecular weight PAN polymer, 250,000 g/mole). The curve for UHMW PAN and that for medium molecular weight PAN essentially overlap. However, the lower molecular weight PAN is significantly lower in cost and easier to make into an encapsulating shell of 1 nm-100 nm in thickness.

FIG. 6 shows the specific capacities of three lithium-FePc (organic) cells, each having Li as an anode active material and FePc/RGO mixture particles as the cathode active material (one cell containing un-encapsulated particles, a second cell containing particles encapsulated by UHMW PAN polymer, and third cell containing particles encapsulated by medium molecular weight PAN polymer, 250,000 g/mole). The curve for UHMW PAN and that for medium molecular weight PAN protection essentially overlap. However, the lower molecular weight PAN is significantly lower in cost and easier to make into an encapsulating shell of 1 nm-100 nm in thickness. The cycling behaviors of these latter 2 lithium cells exhibit a significantly more stable cycling response as compared to the cell containing unprotected cathode materials.

This encapsulation polymer reduces or eliminates direct contact between the catalytic transition metal element (Fe) and the electrolyte, yet still being permeable to lithium ions. This polymer also completely eliminates the dissolution of naphthalocyanine compounds in the liquid electrolyte. This approach has significantly increased the cycle life of all lithium-organic batteries.

EXAMPLE 5

Effect of Lithium Ion-Conducting Additive in a Protecting Polymer

A wide variety of lithium ion-conducting additives were added to several different polymer matrix materials to prepare encapsulation shell materials for protecting core particles of a cathode active material. The lithium ion conductivity vales of the resulting polymer/salt complex materials are summarized in Table 1 below. We have discovered that these polymer composite materials are suitable encapsulation shell materials provided that their lithium ion conductivity at room temperature is no less than $10^{-8}$ S/cm. With these materials, lithium ions appear to be capable of readily diffusing in and out of the encapsulation shell having a thickness no greater than 1 µm. For thicker shells (e.g. 1 µm), a lithium ion conductivity at room temperature no less than $10^{-5}$ S/cm would be required.

TABLE 1

Lithium ion conductivity of various protecting polymer compositions as a shell material for protecting anode active material particles.

| Sample No. | Lithium-conducting additive | Polymer + PC or EC (1-2 μm thick) | Li-ion conductivity (S/cm) |
|---|---|---|---|
| UE-1p | $Li_2CO_3 + (CH_2OCO_2Li)_2$ | 70-99% PEO | $2.5 \times 10^{-4}$ to $3.6 \times 10^{-3}$ S/cm |
| UE-2p | $Li_2CO_3 + (CH_2OCO_2Li)_2$ | 65-99% PAN | $5.6 \times 10^{-4}$ to $3.3 \times 10^{-3}$ S/cm |
| UE-3p | $Li_2CO_3 + (CH_2OCO_2Li)_2$ | 65-99% PEO + PPO | $9.5 \times 10^{-4}$ to $4.7 \times 10^{-3}$ S/cm |
| UD-4p | $Li_2CO_3 + (CH_2OCO_2Li)_2$ | 70-99% PMMA | $9.7 \times 10^{-5}$ to $4.3 \times 10^{-4}$ S/cm |
| UD-5p | $Li_2CO_3 + (CH_2OCO_2Li)_2$ | 75-99% PVDF-HFP | $8.1 \times 10^{-5}$ to $1.2 \times 10^{-3}$ S/cm |
| UB1p | $LiF + LiOH + Li_2C_2O_4$ | 60-90% PVDF-HFP | $9.6 \times 10^{-5}$ to $2.3 \times 10^{-3}$ S/cm |
| UB2p | LiF + HCOLi | 80-99% PVDF-HFP | $4.6 \times 10^{-5}$ to $4.9 \times 10^{-4}$ S/cm |
| UB3p | LiOH | 70-99% PPO | $4.6 \times 10^{-3}$ to $3.2 \times 10^{-2}$ S/cm |
| UB4p | $Li_2CO_3$ | 70-99% PPO | $3.1 \times 10^{-3}$ to $9.9 \times 10^{-3}$ S/cm |
| UB5p | $Li_2C_2O_4$ | 70-99% PPO | $1.9 \times 10^{-3}$ to $1.7 \times 10^{-2}$ S/cm |
| UB6p | $Li_2CO_3 + LiOH$ | 70-99% PEG | $1.9 \times 10^{-3}$ to $2.5 \times 10^{-2}$ S/cm |
| UC1p | $LiClO_4$ | 70-99% PEO | $4.8 \times 10^{-4}$ to $2.8 \times 10^{-3}$ S/cm |
| UC2p | $LiPF_6$ | 70-99% PEO | $5.5 \times 10^{-4}$ to $8.5 \times 10^{-3}$ S/cm |
| UC3p | $LiBF_4$ | 70-99% PEGDA | $1.2 \times 10^{-4}$ to $1.8 \times 10^{-3}$ S/cm |
| UC4p | $LiBOB + LiNO_3$ | 70-99% PEGDA | $2.4 \times 10^{-4}$ to $4.6 \times 10^{-3}$ S/cm |
| US1p | Sulfonated polyaniline | 85-99% PAN | $5.8 \times 10^{-5}$ to $9.2 \times 10^{-4}$ S/cm |
| US2p | Sulfonated SBR | 85-99% PEG-de | $1.7 \times 10^{-4}$ to $2.2 \times 10^{-3}$ S/cm |
| US3p | Sulfonated PVDF | 80-99% PEG | $3.3 \times 10^{-4}$ to $4.4 \times 10^{-4}$ S/cm |

EXAMPLE 6

Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented cathode electrodes containing cathode active material particles encapsulated by different protecting polymers.

TABLE 2

Cycle life data of various lithium secondary (rechargeable) batteries.

| Sample ID | Encapsulation polymer | Type & % of cathode active material | Initial capacity (mAh/g) | Cycle life (No. of cycles) |
|---|---|---|---|---|
| $CuCl_2$-1e | PEO | 85% by wt. $CuCl_2$ particles (80 nm) + 7% graphite + 8% binder | 530 | 1685 |
| $CuCl_2$-2e | none | 85% by wt. $CuCl_2$ particles (80 nm) + 7% graphite + 8% binder | 527 | 113 |
| $BiF_3$-1e | none | 85% by wt. $BiFe_3$ particles + 7% graphene + 8% binder | 275 | 115 |
| $BiF_3$-2e | PAN | 85% by wt. $BiFe_3$ particles + 7% graphene + 8% binder | 276 | 1,410 |
| $Li_2MnSiO_4$-1e | PPO | 85% C-coated $Li_2MnSiO_4$ + 7% CNT + 8% binder | 252 | 2,620 |
| $Li_2MnSiO_4$-2e | none | 85% C-coated $Li_2MnSiO_4$ + 7% CNT + 8% binder | 252 | 543 |
| $Li_6C_6O_6$-1e | PEO + 20% polyanniline | $Li_6C_6O_6$-graphene ball-milled | 440 | 1,520 |
| $Li_6C_6O_6$-2e | none | $Li_6C_6O_6$-graphene ball-milled | 438 | 116 |
| $MoS_2$-1e | PEO + 1% graphene | 85% $MoS_2$ + 8% graphite platelets + binder | 225 | 2,560 |
| $MoS_2$-2e | none | 85% $MoS_2$ + 8% graphite platelets + binder | 225 | 156 |

These data further confirm that the protecting polymer encapsulation strategy is surprisingly effective in alleviating the cathode structural instability-induced capacity decay problems. The protecting polymer encapsulation layer appears to be capable of preventing liquid electrolyte from being in direct physical contact with the cathode active material and, thus, preventing the catalytic elements (e.g. Fe, Mn, Ni, Co, etc.) in the cathode active material from catalyzing the decomposition of the electrolyte to form volatile or flammable gas molecules inside the battery cell. This otherwise could cause fast capacity decay and fire and explosion hazard. The protecting polymer encapsulation layer also prevents dissolution of an organic or polymeric active material in the liquid electrolyte, which otherwise would lead to fast loss of the active material and, thus, capacity loss.

We claim:

1. A particulate of a cathode active material for a lithium battery, said particulate comprising one or a plurality of cathode active material particles being embraced or encapsulated by a thin layer of a protecting polymer having a molecular weight less than $0.5 \times 10^6$ g/mole, a lithium ion conductivity from $10^{-8}$ S/cm to $5 \times 10^{-2}$ S/cm at room temperature, and a thickness from 0.5 nm to 10 μm, wherein said protecting polymer layer contains a polymer selected from the group consisting of derivatives of PEG, poly(ethylene glycol diacrylate) (PEGDA), polyethylene glycol methyl ether (PEG-me), polyethylene glycol dimethyl ether (PEG-de), interpenetrating polymer networks thereof, and combinations thereof, wherein said protecting polymer isolates the cathode active material from a non-aqueous electrolyte, polymer gel electrolyte, ionic liquid electrolyte, quasi-solid electrolyte, or solid-state electrolyte.

2. The particulate of claim 1, wherein said protecting polymer layer contains a lithium salt dispersed between chains of said protecting polymer.

3. The particulate of claim 1, wherein said protecting polymer layer contains an electrically conductive material dispersed therein.

4. The particulate of claim 3, wherein said electrically conducting material is selected from an electron-conducting polymer, a metal particle or wire, a graphene sheet, a carbon fiber, a graphite fiber, a carbon nanofiber, a graphite nanofiber, a carbon nanotube, a graphite particle, an expanded graphite flake, an acetylene black particle, or a combination thereof wherein said electrically conducting material has a thickness or diameter less than 100 nm.

5. The particulate of claim 1, wherein said protecting polymer layer contains a lithium salt dispersed therein wherein said lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, and combinations thereof.

6. The particulate of claim 1, wherein said protecting polymer layer has a thickness from 1 nm to 1 μm.

7. The particulate of claim 1, wherein said protecting polymer layer has a thickness less than 100 nm.

8. The particulate of claim 1, wherein said protecting polymer layer has a thickness less than 10 nm.

9. The particulate of claim 1, wherein said protecting polymer layer has a lithium ion conductivity from $10^{-5}$ S/cm to $10^{-2}$ S/cm.

10. The particulate of claim 1, wherein said cathode active material is selected from an inorganic material, an organic material, a polymeric material, or a combination thereof, and said inorganic material does not include sulfur or alkali metal polysulfide.

11. The particulate of claim 10, wherein said inorganic material is selected from a metal oxide, metal phosphate, metal silicide, metal selenide, transition metal sulfide, or a combination thereof.

12. The particulate of claim 10, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicate, or a combination thereof.

13. The particulate of claim 10, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof.

14. The particulate of claim 10, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq1$.

15. The particulate of claim 10, wherein said inorganic material is selected from a transition metal dichalcogenide, a transition metal trichalcogenide, or a combination thereof.

16. The particulate of claim 10, wherein said inorganic material is selected from $TiS_2$, $TaS_2$, $MoS_2$, $NbSe_3$, $MnO_2$, $CoO_2$, an iron oxide, a vanadium oxide, or a combination thereof.

17. The particulate of claim 11, wherein said metal oxide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

18. The particulate of claim 10, wherein said metal oxide or metal phosphate is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

19. The particulate of claim 10, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) and combinations thereof.

20. The particulate of claim 10, wherein said organic material or polymeric material is selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino (triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, hexaazatrinaphthylene (HATN), hexaazatriphenylene hexacarbonitrile ($HAT(CN)_6$), 5-benzylidene hydantoin, Isatine lithium salt, pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof, wherein said thioether polymer is selected from poly[methanetetryl-tetra (thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis (propylthio)benzene] (PTKPTB, or poly[3,4(ethylenedithio) thiophene] (PEDTT).

21. The particulate of claim 10, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

22. The particulate of claim 1, wherein said cathode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

23. The particulate of claim 1, wherein one or a plurality of said particles is coated with a layer of carbon or graphene.

24. The particulate of claim 1, wherein said protective polymer layer is a neat polymer having no additive or filler dispersed therein.

25. The particulate of claim 1, wherein said protective polymer layer contains from 0.1% to 50% by weight of a lithium ion-conducting additive dispersed therein, or contains therein from 0.1% by weight to 10% by weight of a reinforcement nano filament selected from carbon nanotube, carbon nano-fiber, graphene, or a combination thereof.

26. The particulate of claim 1, wherein said protective polymer layer contains a lithium ion-conducting additive dispersed therein to form a composite wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

27. The particulate of claim 1, wherein said protective polymer layer further contains an electron-conducting polymer mixed with said protecting polymer and said electron-conducting polymer is selected from polyaniline, polypyrrole, polythiophene, polyfuran, a bi-cyclic polymer, a sulfonated derivative thereof, or a combination thereof to form a blend, co-polymer, or semi-interpenetrating polymer network.

28. A cathode active material layer containing multiple particulates of claim 1, an optional conductive additive, and an optional binder that bonds said multiple particulates together.

29. A lithium battery containing an optional anode current collector, an anode active material layer, the cathode active material layer as defined in claim 28, an optional cathode current collector, an electrolyte in ionic contact with said anode active material layer and said cathode active material layer, and an optional porous separator.

30. The lithium battery of claim 29, which is a lithium-ion battery or lithium metal battery.

31. A method of manufacturing a lithium battery, said method comprising:
(a) providing a cathode active material layer and an optional cathode current collector to support said cathode active material layer;
(b) providing an anode active material layer and an optional anode current collector to support said anode active material layer; and
(c) providing an electrolyte in contact with the anode active material layer and the cathode active material layer and an optional separator electrically separating the anode and the cathode;

wherein the operation of providing the cathode active material layer includes providing multiple particulates of a cathode active material, wherein at least one of said particulates is composed of one or a plurality of cathode active material particles being fully embraced or encapsulated by a thin layer of a protecting polymer having a molecular weight less than $0.5 \times 10^6$ g/mole, a lithium ion conductivity from $10^{-8}$ S/cm to $5\times10^{-2}$ S/cm at room temperature, and a thickness from 0.5 nm to 10 µm, wherein said protecting polymer layer contains a polymer selected from the group consisting of chemical derivatives of PEG, poly(ethylene glycol diacrylate) (PEGDA), polyethylene glycol methyl ether, polyethylene glycol dimethyl ether, interpenetrating polymer networks thereof, and combinations thereof, wherein said protecting polymer is a high elasticity polymer having a recoverable tensile strain no less than 5%, wherein said protecting polymer isolates the cathode active material from a non-aqueous electrolyte, polymer gel electrolyte, ionic liquid electrolyte, quasi-solid electrolyte, or solid-state electrolyte.

32. The method of claim 31, wherein said protecting polymer forms a mixture with an electronically conductive polymer, a lithium-ion conducting material, a reinforcement material, or a combination thereof.

33. The method of claim 32, wherein said lithium ion-conducting material is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

34. The method of claim 32, wherein said lithium ion-conducting material is dispersed in said high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

35. The method of claim 31, wherein said providing multiple particulates includes encapsulating or embracing said one or a plurality of cathode active material particles with said thin layer of protecting polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

36. The method of claim 31, wherein said cathode active material is selected from an inorganic material, organic material, polymeric material, or a combination thereof and wherein said inorganic material does not include sulfur or alkali metal polysulfide.

37. The method of claim 31, wherein said one or a plurality of cathode active material particles is coated with a layer of carbon or graphene.

38. The method of claim 31, wherein said one or a plurality of cathode active material particles is mixed with a carbon, graphene, or graphite material to form a mixture and said mixture is embraced by one or a plurality of graphene sheets.

39. The method of claim 31, wherein said one or plurality of cathode active material particles are mixed with a carbon material, a graphite material, and/or graphene sheets to form a mixture that is embraced by external graphene sheets to form graphene-embraced cathode active material particulates, which are then encapsulated by high-elasticity polymer.

\* \* \* \* \*